United States Patent
Nakaya (10) Patent No.: US 9,162,609 B2
(45) Date of Patent: Oct. 20, 2015

(54) VEHICLE HEADLIGHT

(71) Applicant: Stanley Electric Co., Ltd., Tokyo (JP)

(72) Inventor: Yoshiaki Nakaya, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 208 days.

(21) Appl. No.: 13/928,463

(22) Filed: Jun. 27, 2013

(65) Prior Publication Data

US 2014/0003070 A1    Jan. 2, 2014

(30) Foreign Application Priority Data

Jun. 27, 2012 (JP) .................................. 2012-144195

(51) Int. Cl.
*B60Q 1/08* (2006.01)
*F21S 8/10* (2006.01)

(52) U.S. Cl.
CPC *B60Q 1/08* (2013.01); *B60Q 1/085* (2013.01); *F21S 48/115* (2013.01); *F21S 48/1154* (2013.01); *F21S 48/1208* (2013.01); *F21S 48/1388* (2013.01); *F21S 48/1757* (2013.01); *B60Q 2300/056* (2013.01); *B60Q 2300/42* (2013.01); *B60Q 2300/45* (2013.01)

(58) Field of Classification Search
CPC ................. B60Q 1/076; B60Q 1/1423; B60Q 2300/056; B60Q 1/08; F21S 48/1154
USPC .................................................. 362/462–465
See application file for complete search history.

(56) References Cited

U.S. PATENT DOCUMENTS

| | | | | |
|---|---|---|---|---|
| 6,012,829 A * | 1/2000 | Natchoo | ........................ | 362/524 |
| 6,659,631 B2 * | 12/2003 | Butera et al. | ................... | 362/513 |
| 6,918,691 B2 * | 7/2005 | Gattone et al. | ................. | 362/515 |
| 7,195,384 B2 * | 3/2007 | Chen | ............................. | 362/512 |
| 7,703,954 B2 * | 4/2010 | Kusagaya | ..................... | 362/465 |
| 8,047,694 B2 * | 11/2011 | Lee et al. | ....................... | 362/547 |
| 8,147,107 B2 * | 4/2012 | Lee et al. | ....................... | 362/523 |
| 8,517,578 B2 * | 8/2013 | Shiao et al. | ................... | 362/467 |
| 8,662,726 B2 * | 3/2014 | Koike et al. | ................... | 362/538 |
| 8,714,795 B2 * | 5/2014 | Uchida | ......................... | 362/538 |
| 2009/0046474 A1 | 2/2009 | Sato et al. | | |

FOREIGN PATENT DOCUMENTS

| | | | |
|---|---|---|---|
| JP | 4092283 B2 | 5/2008 |
| JP | 2009-223165 A | 10/2009 |
| JP | 4881255 B2 | 2/2012 |
| WO | 2009/133698 A1 | 11/2009 |
| WO | 2010/021215 A1 | 2/2010 |

* cited by examiner

*Primary Examiner* — Diane Lee
*Assistant Examiner* — Gerald J Sufleta, II
(74) *Attorney, Agent, or Firm* — Kenealy Vaidya LLP (57) ABSTRACT

A vehicle headlight can form a variable light distribution pattern with a simple structure including a favorable fail-safe. The headlight can include a movable mirror facing a light source unit, a static mirror between the movable mirror and the light source unit and a controller to emit light from the light source unit and to scan the light toward the static mirror using the movable mirror having a default position, where receives the light at a position substantially perpendicular thereto. The controller can enable the headlight to provide various light distribution patterns by varying a scanning method and the movable mirror is configured to return the light toward the light source unit even if it fails to operate properly. Thus, the disclosed subject matter can provide a vehicle headlight that can form various light distribution patterns in accordance with surroundings and can have the simple structure including the favorable fail-safe.

20 Claims, 5 Drawing Sheets

VEHICLE HEADLIGHT

This application claims the priority benefit under 35 U.S.C. §119 of Japanese Patent Application No. 2012-144195 filed on Jun. 27, 2012, which is hereby incorporated in its entirety by reference.

BACKGROUND

1. Field

The presently disclosed subject matter relates to a vehicle headlight, and more particularly to a small vehicle headlight using a semiconductor light source and a movable mirror, which can provide various light distribution patterns from at least one small light-emitting opening for a low beam, a high beam and the like, and which can vary a favorable light distribution pattern in accordance with surroundings such as an oncoming vehicle, a forward travelling vehicle, a road, etc.

2. Description of the Related Art

Figure 5:
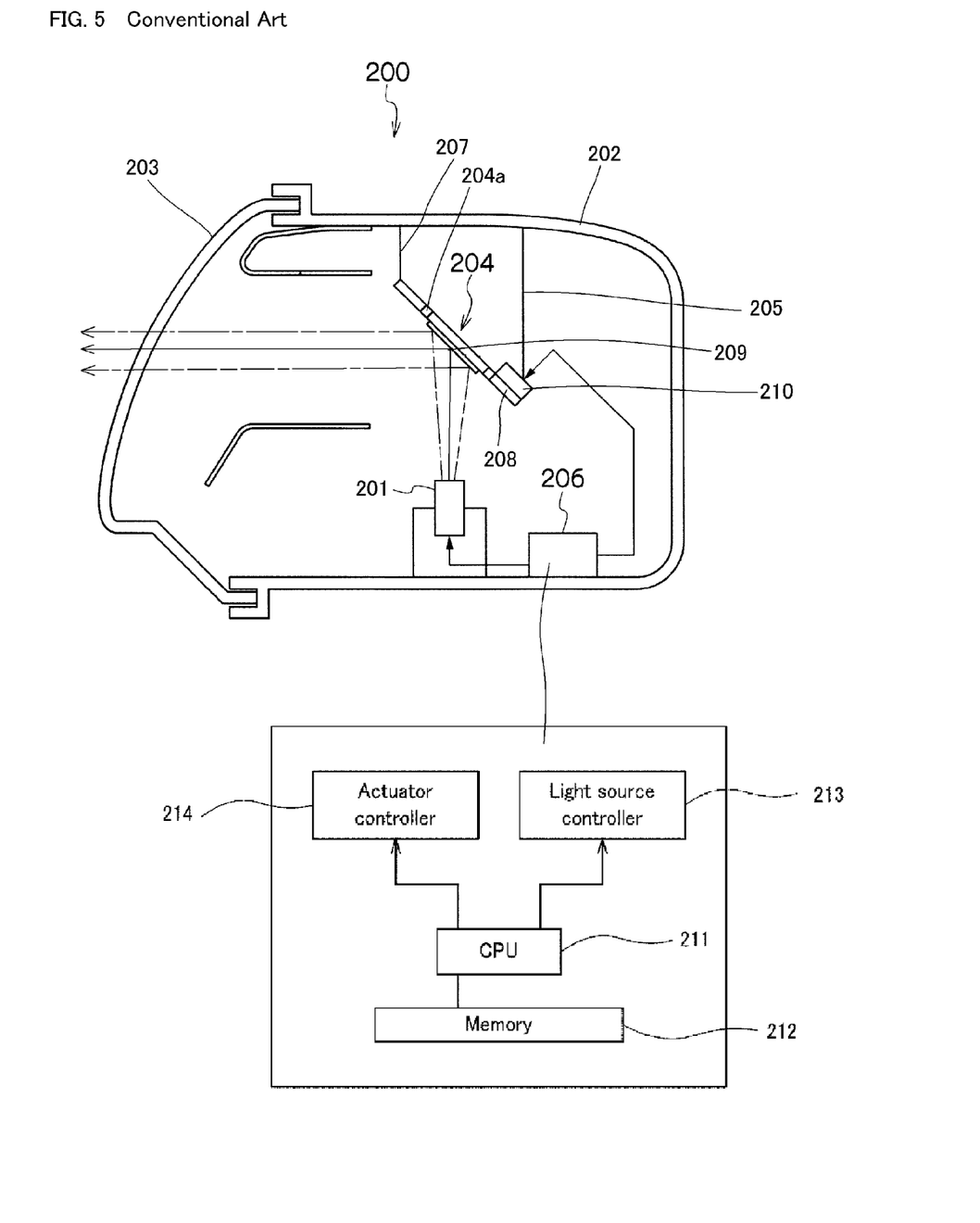
FIG. 5 is a schematic side cross-sectional view showing a conventional vehicle headlight using a semiconductor light source and a movable mirror.

Vehicle headlights using a semiconductor light source and a movable mirror, which can vary a light distribution pattern to maintain a high visibility in accordance with surroundings such as an existence of an oncoming vehicle, a forward travelling vehicle and the like have been developed in recent years. Such a conventional vehicle headlight using a semiconductor light source and a movable mirror is disclosed in Patent Document No. 1 (Japanese Patent No. 4,881,255). FIG. 5 is a schematic side cross-sectional view showing this conventional vehicle headlight.

The conventional vehicle headlight 200 includes: a housing 202 having an opening; an outer lens 203 located adjacent the housing 202 so as to cover the opening; a turning board 204 located in the housing 202; a movable mirror 209 located on the turning board 204 in a direction toward the outer lens 203; an actuator 207 rotating the movable mirror 209 via the turning board 204; a base 208 supporting the turning board 204; a terminal 210 located on the base 208; a bracket 205 attaching the terminal 210 located on the base 208 to the housing 202; a semiconductor light source 201 emitting a visual light toward the movable mirror 209; and a controller 206 controlling the actuator 207 and the semiconductor light source 201 while associating the visual light emitted from the semiconductor light source 201 with the movable mirror 209 via the turning board 204 and the actuator 207.

The controller 206 includes: a central processing unit (CPU) 211; a memory 212 storing a program for operating the CPU 211, data received by the CPU 211, data outputted from the CPU 211 and the like; a light source controller 213 driving the semiconductor light source 201; and an actuator controller 214 operating the actuator 207 to rotate the movable mirror 209 along with the turning board 204 while associating the visual light emitted from the semiconductor light source 201 with the movable mirror 209 via the turning board 204 and the actuator 207.

According to the conventional vehicle headlight 200, the vehicle headlight 200 may form predetermined light distribution patterns by emitting the visual light toward the movable mirror 209 from the semiconductor light source 201 and by reflecting the visual light with the movable mirror 209 while rotating the turning board 204 so that the movable mirror 209 scans the visual light in a horizontal direction. In this case, the vehicle headlight 200 may further include another actuator, which rotates the turning board 204 in a vertical direction so that the movable mirror 209 can adjust the visual light in the vertical direction.

However, the above-described structure of the headlight 200 need to locate the semiconductor light source 201 at least either one of the vertical direction with respect to the movable mirror 209 or the horizontal direction with respect to the movable mirror 209. The conventional vehicle headlight 200 using such a structure may be subject to a large-scaled headlight, and therefore may be difficult to employ as a headlight for a small size car such as a single passenger vehicle, etc.

In addition, when the actuator 207, which continuously scans at high speed using a forward reverse control method, fails to operate properly due to any cause such as a disconnection, a mechanical fatigue and the like, the movable mirror 209 should return at a default position by an original function of a torsion bar 204a connecting between the actuator 207 and the turning board 204 as shown in FIG. 5. In this case, the conventional vehicle headlight 200 may emit the visual light intensively in a constant direction by the movable mirror 209, which stays at the default position, and therefore may not only cause harassments for pedestrians and oncoming vehicles but also may risk to a driver safety.

A scanning image display device using the above-described similar structure is disclosed in Patent Document No. 2 (International Publication WO2009/133698), and also an image projecting device using the above-described similar structure is disclosed in Patent Document No. 3 (International Publication WO2010/021215). These conventional devices may project image data along with visual lights while preventing a twist in the image data. However, light source devices disclosed in these conventional devices may also cause problems similar to these of the conventional headlight 200 as described above.

The above-referenced patent Documents and additional patent Documents are listed below and are hereby incorporated with their English specifications and abstracts in their entireties.

1. Patent Document No. 1: Japanese Patent No. 4,881,255
2. Patent Document No. 2: International Publication WO2009/133698
3. Patent Document No. 3: International Publication WO2010/021215
4. Patent Document No. 4: Japanese Patent Application Laid Open JP2009-223165
5. Patent Document No. 5: Japanese Patent No. 4,092,283

SUMMARY

The disclosed subject matter has been devised to consider the above and other problems, features, and characteristics. Thus, embodiments of the disclosed subject matter can include a vehicle headlight unit using a light source unit and a movable mirror that can provide various light distribution patterns with a compact structure such that can be employed as a headlight for a small size car. The disclosed subject matter can also include a vehicle headlight that can form various light distribution patterns to enhance visibility for driving, with a simple structure, and which can include a favorable fail safe structure even when an actuator thereof fails to operate properly due to various causes, such as a disconnection, mechanical fatigue, and the like.

The presently disclosed subject matter has been devised in view of the above and other problems, features, and characteristics. Another aspect of the disclosed subject matter includes a vehicle headlight that can form an optimum light distribution pattern in accordance with surrounding information such as an existence of an oncoming vehicle, a forward travelling vehicle, a pedestrian and the like detected by a sensor, such as a front sensor attached to a front of a vehicle.

According to another aspect of the disclosed subject matter, a vehicle headlight can include: a housing having a body formed in a tubular shape, a first end plate located adjacent a first opening of the body, an inner surface of the first end plate facing a second opening of the body, a second end plate having a fourth opening, X axis and Y axis located substantially perpendicular to the X axis, and also having at least one of a fifth opening and a sixth opening, each of the fifth opening and the sixth opening being separated by the X axis and intersecting with the Y axis, the fourth opening of the second end plate intersecting with the X axis and the Y axis, the second end plate being located adjacent the second opening of the body, and the fourth opening of the second end plate facing the third opening of the first end plate of the housing; a light source unit located adjacent an outer surface of the first end plate, and emitting light having a substantially white color tone toward a substantially intersection of the X axis and the Y axis of the second end plate via the third opening using a semiconductor light source; and a light deflecting device located adjacent the second end plate of the housing so as to cover the fourth opening, a torsion holder thereof supporting a movable mirror such that can rotate with reference to the X axis and the Y axis, the movable mirror being located toward the third opening of the first end plate, and including the substantially intersection of the X axis and the Y axis, a default position of the movable mirror determined by a restoring force of the torsion holder and the movable mirror being substantially perpendicular to a light-emitting direction of the light emitted from the light source unit at the default position thereof.

In addition, the vehicle headlight can include: an actuator located adjacent the light deflecting device, and rotating the movable mirror in at least one direction of the X axis and the Y axis via the torsion holder; a static mirror having at least one of a first reflection surface and a second reflection surface being located adjacent the inner surface of the first end plate, the first reflection surface having an end line formed in a substantially spheroidal shape, a first focus of the first reflection surface located substantially within the movable mirror, a second focus of the first reflection surface located substantially within the fifth opening of the second end plate, the second reflection surface having an end line also formed in a substantially spheroidal shape, a first focus of the second reflection surface located substantially within the movable mirror, and a second focus of the second reflection surface located substantially within the fifth opening of the second end plate; a controller having an operation unit, an actuator driver and a light source driver configured to control the semiconductor light source, the actuator driver configured to control the actuator, and the operation unit configured to control the actuator driver and the light source driver; and wherein the operation unit associates the light emitted from the light source unit with the movable mirror via the actuator driver, and thereby the light having the substantially white color tone is configured to be projected from at least one of the fifth opening and the sixth opening of the second end plate via the movable mirror and at least one of the first reflection surface of the static mirror reflecting the light toward the fifth opening of the second end plate and the second reflection surface of the static mirror reflecting the light toward the sixth opening of the second end plate during operation.

In the above-described exemplary vehicle headlight, the semiconductor light source can be composed of at least one of a blue laser diode emitting a blue laser beam, a green laser diode emitting a green laser beam, a red laser diode emitting a red laser beam and an ultraviolet laser diode emitting an ultraviolet laser beam to emit the light having the substantially white color tone. The semiconductor light source can be a laser device configured to emit an ultraviolet laser beam and also the wavelength converting material can include at least one of a red phosphor, a green phosphor and a blue phosphor to emit various visual lights for a headlight such as a fog lamp. The second reflection surface of the static mirror can be continuously integrated with the first reflection surface, and a boundary between the first reflection surface and the second reflection surface can be substantially parallel to the X axis of the second end plate of the housing to facilitate a control of the movable mirror, etc.

In the above-described exemplary vehicle headlights, each of a imaginary plane connecting the second focus of the first reflection surface of the static mirror to the end line of the first reflection surface and another imaginary plane connecting the second focus of the second reflection surface of the static mirror to the end line of the second reflection surface can be configured to be substantially parallel to the X axis of the second end plate of the housing, and thereby each of lights reflected by reflection surfaces located close to both end lines of the first reflection surface and the second reflection surface can be configured to be projected in a direction substantially parallel to the X axis of the second end plate of the housing so as to overlap with respect to each other, in order to provide a favorable light distribution for a driver. Moreover, at least one of the first reflection surface and the second reflection surface of the static mirror can be integrated with the inner surface of the first end plate of the housing, and therefore can also be formed on the inner surface of the first end plate of the housing to reduce manufacturing process for the vehicle headlight.

According to the above-described exemplary vehicle headlight, the vehicle headlight can form various light distribution patterns with a compact structure by varying a scanning method of the movable mirror facing the light source unit. Additionally, the movable mirror can be attached to the light deflecting device in the default position, where the movable mirror can receive the light at the substantially position perpendicular thereto, and therefore can return the light toward the light source unit at the default position. Thus, the disclosed subject matter can also include a vehicle headlight that can form various light distribution patterns to enhance a visibility for a drive with a simple structure, and which can include a favorable fail safe structure even when an actuator thereof fails to operate properly due to any cause such as a disconnection, a mechanical fatigue and the like.

According to another aspect of the disclosed subject matter, the above-described exemplary vehicle headlight can further include a front sensor associated with the controller. The front sensor can be configured to detect surrounding information, wherein the operation unit of the controller is configured to receive the surrounding information from the front sensor. The exemplary vehicle headlight can further include a communication unit incorporated into the controller, and the communication unit can be configured to receive communication information, wherein the operation unit of the controller is configured to receive the communicate information from the communication unit.

According to the above exemplary vehicle headlight, the vehicle headlight can detect the surrounding information using the front sensor and can determine the optimum light distribution pattern using the operation unit in accordance with the surrounding information. The vehicle headlight can also receive location information for the vehicle, time information, weather information and the like and can also determine the optimum light distribution pattern using the operation unit in accordance with the communication information. Thus, the disclosed subject matter can provide the vehicle headlight that can form the optimum light distribution pattern in accordance with the surrounding information and the communication information.

BRIEF DESCRIPTION OF THE DRAWINGS

These and other characteristics and features of the disclosed subject matter will become clear from the following description with reference to the accompanying drawings, wherein:

FIG. 3 is a block diagram showing a controller of the vehicle headlight shown in FIG. 1a;

DETAILED DESCRIPTION OF EXEMPLARY EMBODIMENTS

Figure 1A:
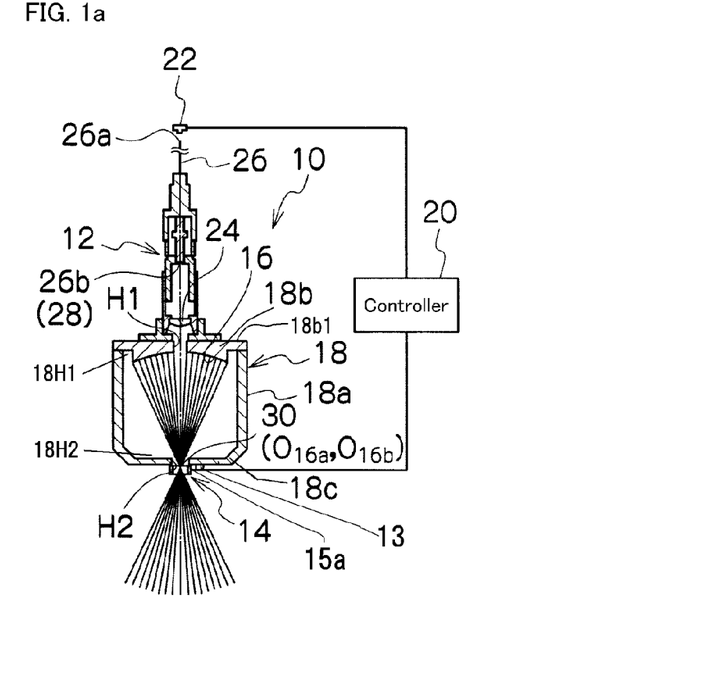
FIGS. 1a, 1b and 1c are a schematic top cross-sectional view, a front view and a side cross-sectional view showing an exemplary embodiment of a vehicle headlight made in accordance with principles of the disclosed subject matter, respectively.
Figure 1B:
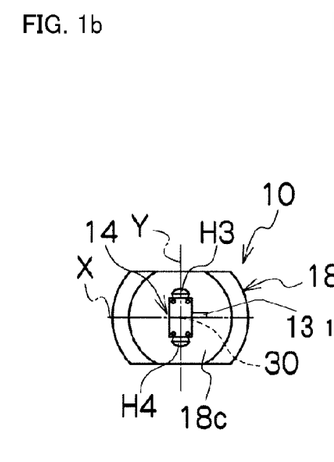
Figure 1C:
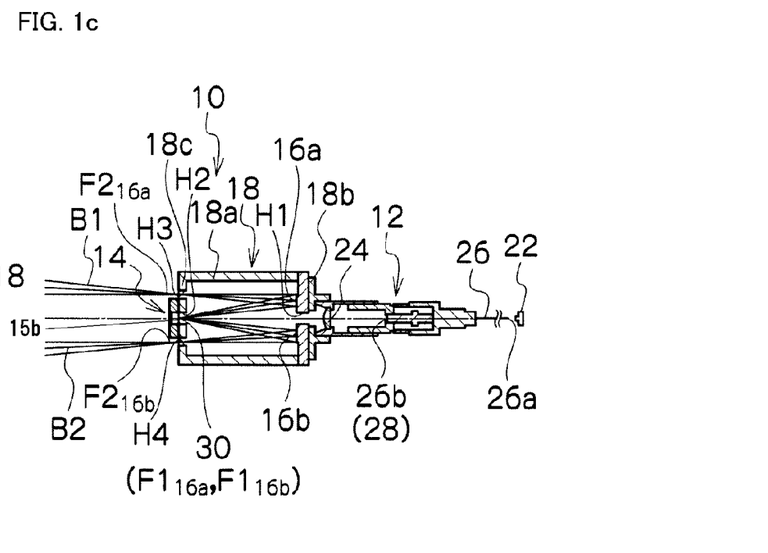

Exemplary embodiments of the disclosed subject matter will now be described in detail with reference to FIG. 1a to FIG. 4c. FIGS. 1a, 1b and 1c are a schematic top cross-sectional view, a front view and a side cross-sectional view showing an exemplary embodiment of a vehicle headlight made in accordance with principles of the disclosed subject matter, respectively. The vehicle headlight 10 can be attached to a front right or a front left of a vehicle. When the vehicle is a small car such as a single passenger vehicle, the vehicle headlight may be attached to a front middle of the vehicle.

The vehicle headlight 10 can include: a housing 18 including a body 18a, which is formed in a tubular shape having a first opening 18H1 and a second opening 18H2, a first end plate 18b having a third opening H1 being located adjacent the first opening 18H1 of the body 18a, and a second end plate 18c having a fourth opening H2, a fifth opening H3 and a sixth opening H4, and located adjacent the second opening 18H2 of the housing 18; a light deflecting device 14 having a movable mirror 30 and a torsion holder 15a and 15b, and located adjacent the second end plate 18c of the housing 18 so as to cover the fourth opening H2 of the second end plate 18c; a light source unit 12 including a semiconductor light source 22, located adjacent an outer surface 18b1 of the first end plate 18b of the housing 18 and being located in an opposite direction of the second end plate 18c; a static mirror 16 located adjacent the first end plate 18b of the housing 18 and being located in a facing direction of the second end plate 18c of the housing 18; and a controller 20 controlling the light deflecting device 14 and the semiconductor light source 22 while associating a visual light emitted from the light source unit 12 with the light deflecting device 14.

The light source unit 12 can include: the semiconductor light source 22 emitting a laser beam; a light fiber 26 having an incident surface 26a and a light-emitting surface 26b, and guiding the laser beam emitted from the semiconductor light source 22 from the incident surface 26a toward the light-emitting surface 26b thereof; a wavelength converting material 28 located adjacent the light-emitting surface 26b of the light fiber 26, and wavelength-converting the laser beam emitted from the light-emitting surface 26b of the light fiber 26 into the visual light having a substantially white color tone and the like; and a collimated lens 24 collimating the visual light converted by the wavelength converting material 28.

The semiconductor light source 22 can emit the laser beam such as a blue laser light having a wavelength of 400 to 450 nm, and the wavelength converting material 28 can be disposed on the light-emitting surface 26b of the light fiber 26 to wavelength-convert the blue laser beam emitted from the semiconductor light source 22 into the visual light having the substantially white color tone. Accordingly, the wavelength converting material 28 can include a yellow phosphor, which can emit a yellow light being a complementary color of a blue light by exciting the yellow phosphor with the blue laser beam emitted from the semiconductor light source 22.

Thereby, the visual light having the substantially white color tone can be emitted from the wavelength converting material 28 toward the collimated lens 24 of the light source unit 12 by mixing the yellow light of the yellow phosphor included in the wavelength converting material 28 with the blue laser beam emitted from the semiconductor light source 22. The yellow phosphor can include, $Y_3Al_5O_{12}$: $Ce^{3+}$ (YAG), $(Sr,Ba)_2SiO_4$: $Eu^{2+}$, $Ca_x(Si,Al)_{12}(O,N)_{16}$: $Eu^{2+}$ and the like.

In place of the yellow phosphor, a red phosphor wavelength-converting the blue laser beam emitted from the semiconductor light source 22 into red-purple light, and a green phosphor wavelength-converting the blue laser beam into blue-green light can also be used. In this case, the light source unit 12 can emit a visual light having a substantially white light by an additive color mixture of the red-purple light emitted from the red phosphor that is excited by the blue laser beam, the blue-green light emitted from the green phosphor that is excited by the blue laser beam, and a part of the blue laser beam.

The red phosphor can include $CaAlSiN_3$: $Eu^{2+}$, $Ca_2Si_5N_8$: $Eu^{2+}$, $La_2O_2S$: $Eu^{3+}$, $KSiF_6$: $Mn^{4+}$, $KTiF_6$: $Mn^{4+}$ and the like. $Y_3(Ga,Al)_5O_{12}$: $Ce^{3+}$, $Ca_3Sc_2Si_3O_{12}$: $Ce^{3+}$, $CaSc_2O_4$: $Eu^{2+}$, $(Ba,Sr)_2SiO_4$: $Eu^{2+}$, $Ba_3Si_6O_{12}N_2$: $Eu^{2+}$, $(Si,Al)_6(O,N)$: $Eu^{2+}$ and the like can be used as the green phosphor. The semiconductor light source 22 can include an LED of InGaN series that emits near-ultraviolet light having a wavelength of approximately 380 nanometers, a laser diode that emits an ultraviolet laser beam at a high power, and the like.

In this case, in order to emit the visual light having the substantially white color tone, which can be used as a light source for a headlight so as to satisfy a white color zone on CIE chromaticity diagram prescribed under a standard for a headlight, the wavelength converting material 28 can include: a red phosphor wavelength-converting the ultraviolet light into red light; a green phosphor wavelength-converting the ultraviolet light into green light; and a blue phosphor wavelength-converting the ultraviolet light into blue light. $CaAlSiN_3$: $Eu^{2+}$, $Ca_2Si_5N_8$: $Eu^{2+}$, $La_2O_2S$: $Eu^{3+}$, $KSiF_6$: $Mn^{4+}$, $KTiF_6$: $Mn^{4+}$ and the like can be used as the red phosphor. $(Si,Al)_6(O,N)$: $Eu^{2+}$, $BaMgAl_{10}O_{17}$: $Eu^{2+}Mn^{2+}$, $(Ba,Sr)_2SiO_4$: $Eu^{2+}$ and the like can be used as the green phosphor. $(Sr,Ca,Ba,Mg)_{10}(PO_4)_6C_{12}$: $Eu^{2+}$, $BaMgAl_{10}O_{17}$: $Eu^{2+}$, $LaAl(Si, Al)_6(N,O)_{10}$: $Ce^{3+}$ and the like can be used as the blue phosphor.

In addition, the wavelength converting material 28 can be made by mixing the above-described phosphor with a transparent resin, an inorganic binder and the like in order to be able to emit the visual light having the substantially white color tone while collaborating with the light source unit 12. Moreover, the semiconductor light source 22 can also include a red laser diode emitting a red laser beam, a green laser diode emitting a green laser beam and a blue laser diode emitting a blue laser beam, so that the light source unit 12 can emit the visual light having the substantially white color tone without the wavelength converting material 28.

Furthermore, the light source unit 12 can emit various color lights by combing at least one of the above-described laser beams with the wavelength material 28 including at least one of the above-described phosphors. For example, the light source unit 12 can emit a visual light having a yellow color tone by an additive color mixture, which combines the ultraviolet laser beam with the wavelength converting material 28 including the red phosphor and the green phosphor, and thereby can be used as a light source unit for a vehicle headlight such as a fog lamp.

The first end plate 18b having the third opening H1 can be located at the first opening 18H1 of the body 18a as described above, and the third opening H1 can be located in the first end plate 18b so that the visual light having the substantially white color tone, which is collimated by the collimated lend 24, can pass through the third opening H1 of the first end plate 18b of the housing 18. Accordingly, the visual light emitted from the light source unit 12 can get to the light deflecting device 14, which is located adjacent the second end plate 18c so as to cover the fourth opening H2 and so as to avoid blocking the fifth opening H3 and the sixth opening H4 of the second end plate 18c, after passing through the third opening H1 of the housing 18 as shown in FIG. 1c.

The light deflecting device 14 can scan the visual light emitted from the light source unit 12 toward the static mirror 16, and therefore is frequently known as described as a micro mirror device or a mirror deflecting device. The light deflecting device 14 can include: a movable mirror 30, which can reflect the visual light emitted from the light source unit 12 toward the static mirror 16; the torsion holder 15a and 15b (e.g., torsion bar) supporting the movable mirror 30 from both directions of a horizontal X axis and a vertical Y axis, which are substantially perpendicular to each other as shown in FIG. 1b, toward a substantially intersection of the X axis and the Y axis, so that the movable mirror 30 rotates with respect to the horizontal axis X and the vertical axis Y; and an actuator 13 (e.g. piezoelectric actuator) rotating the movable mirror 30 with respect to the horizontal axis X and the vertical axis Y during operation.

The movable mirror 30 can be a microelectromechanical system (MEMS) mirror, which is formed in a circular shape having a diameter of an approximately 1 mil meter. The light deflecting device 14 can be attached to the second end plate 18c while the movable mirror 30 faces each of the third opening H1 of the first end plate 18b and the fourth opening H2 of the second end plates 18c of the housing 18. Therefore, the movable mirror 30 can receive the visual light emitted from the light source unit 12 after it passes through each of the third and forth openings H1 and H2 of the first and second end plates 18b and 18c.

In addition, the movable mirror 30 can be attached to the light deflecting device 14 via the torsion holder 15a and 15b in a default position, where the movable mirror 30 can receive the visual light having the substantially white color tone at a substantially position perpendicular thereto. The movable mirror 30 can scan the visual light in the vertical direction and in the horizontal direction with reference to the default position thereof using the actuator 13 via the torsion holder 15a and 15b. Meanwhile the movable mirror 30 can maintain at the default position so that the movable mirror 30 can receive the visual light at the substantially position perpendicular thereto by a restoring force of the torsion holder 15a and 15b, when the actuator 13 does not operate.

Figure 2A:
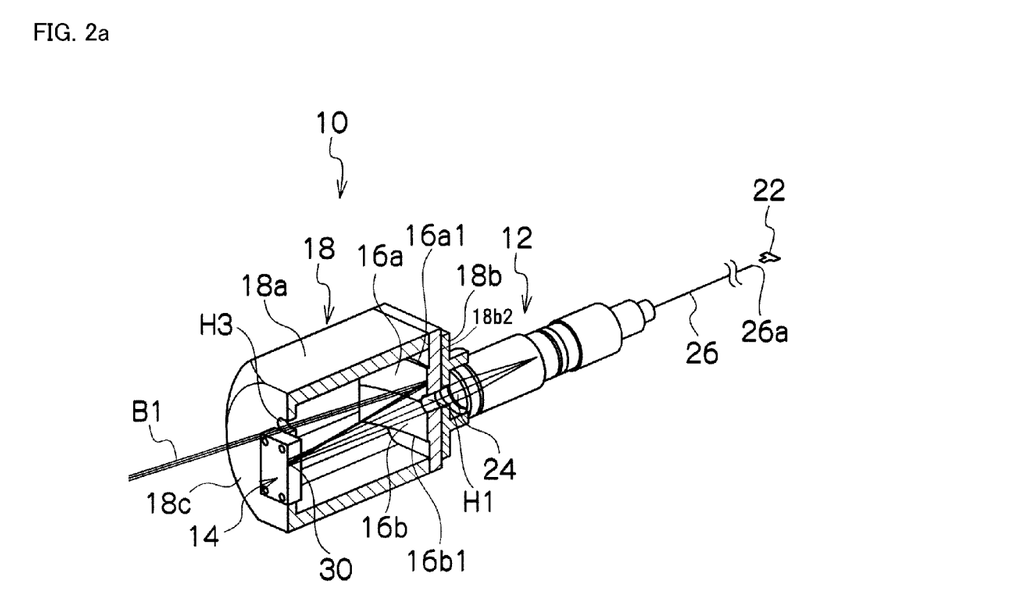
FIGS. 2a and 2b are perspective cross-sectional views from an oblique front and an oblique rear depicting the vehicle headlight shown in FIG. 1a to FIG. 1c.
Figure 2B:
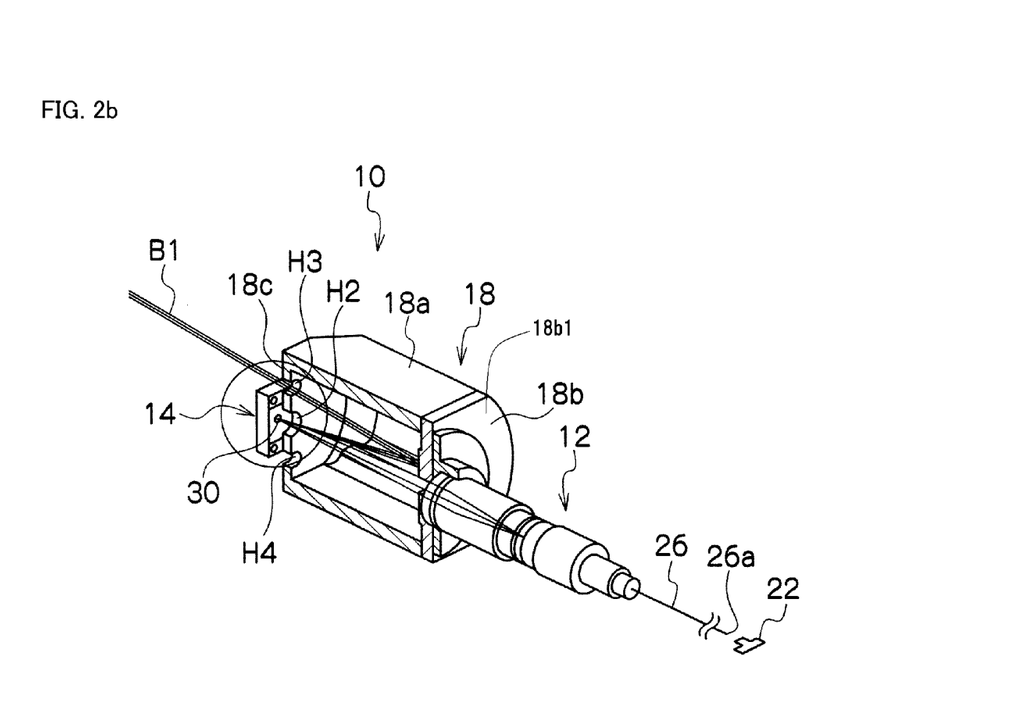

The light deflecting device 14 including the movable mirror 30, can, for example, be configured as the optical mirrors disclosed in Patent Document No. 4 (Japanese Patent Application Laid Open JP2009-223165) and Patent Document No. 5 (Japanese Patent No. 4,092,283), which are commonly assigned with the owner of the presently disclosed subject matter. FIGS. 2a and 2b are perspective cross-sectional views from an oblique front and an oblique rear depicting the vehicle headlight shown in FIG. 1a to FIG. 1c, in which the actuator 13 and the torsion holder 15a and 15 are abbreviated to facilitate an understanding of following descriptions.

The static mirror 16 can be formed in a substantially rectangular shape in view from a front of the vehicle headlight 10, and also can be configured with a reflection surface, which is formed by metal-evaporating aluminum, silver, etc. The static mirror 16 can be located between the light source unit 12 and the light reflecting device 14 so as to receive the visual light, which is scanned by the movable mirror 30 and passes through the fourth opening H2 of the second end plate 18c of the housing 18. The static mirror 16 can include the third opening H1, which extends from the third opening H1 of the first end plate 18b toward the static mirror 16 so as to be able to pass through the visual light emitted from the light source unit 12 toward the movable mirror 30.

The static mirror 16 can include a first reflection surface 16a having an upper end line 16a1, which is located in an upward direction of the static mirror 16, and a second reflection surface 16b having a lower end line 16b1, which is located in a downward direction of the static mirror 16. A boundary between the first reflection surface 16a and the second reflection surface 16b can intersect with a substantially center of the third opening H1 of the static mirror 16 and be located substantially perpendicular to the horizontal axis X corresponding to a rotating direction of the movable mirror 30.

The static mirror 16 can be located adjacent an inner surface 18b2 of the first end plate 18b and can be located in a direction toward the second end plate 18c. In this case, the static mirror 16 can also be integrated with the first end plate 18b as one body, and therefore can be formed on the inner surface 18b2 of the first end plate 18b of the housing 18. Thereby, manufacturing processes for the vehicle headlight and the number of parts of the vehicle headlight can be reduced.

The first reflection surface 16a can reflect the visual light scanned by the movable mirror 30 in an upward direction of the light deflecting device 14, and can pass through the fifth opening H3, which is located in the second plate 18c of the housing 18 and is located in the upward direction of the light deflecting device 14 in order to emit the visual light having the substantially white color tone in a direction toward a light-emission of the vehicle headlight 10 as shown in FIG. 2a and FIG. 2b.

In this case, the visual light reflected by the first reflection surface 16a of the static mirror 16 can form a substantially upward light distribution pattern on a horizontal line of an imaginary vertical screen, which is located 25 meters away from the vehicle headlight 10. In order to form the above-described light distribution pattern, the first reflection surface 16a of the static mirror 16 can wholly be formed in a spheroidal shape (ellipsoid of revolution) having a first focus $F1_{16a}$ and a second focus $F2_{16a}$, in which the first focus $F1_{16a}$ is located within a range of the movable mirror 30, and the second focus $F2_{16a}$ is located within a range of the fifth opening H3 of the second end plate 18c that is located in the upward direction of the light deflecting device 14 as shown in FIG. 1c.

In addition, cross-sectional shapes of the first reflection surface 16a in a direction toward the horizontal axis X corresponding to the rotating direction of the movable mirror 30 can be formed in a substantially circular shape having a center $O_{16a}$, and the center $O_{16a}$ can be located within the range of the movable mirror 30 of the light deflecting device 14.

On the other hand, the second reflection surface 16b can reflect the visual light scanned by the movable mirror 30 in a lower direction of the light deflecting device 14, and can pass through the sixth opening H4, which is located in the second plate 18c of the housing 18 and is located in the downward direction of the light reflecting device 14 in order to emit the visual light having the substantially white color tone in the direction toward the light-emission of the vehicle headlight 10.

The visual light reflected by the second reflection surface 16b of the static mirror 16 can form a substantially downward light distribution pattern on the horizontal line of the imaginary vertical screen, which is located 25 meters away from the vehicle headlight 10. To form the above-described light distribution pattern, the second reflection surface 16b of the static mirror 16 can wholly be formed in a spheroidal shape (ellipsoid of revolution) having a first focus $F1_{16b}$ and a second focus $F2_{16b}$, in which the first focus $F1_{16b}$ is located within the range of the movable mirror 30, and the second focus $F2_{16b}$ is located within a range of the sixth opening H4 of the second end plate 18c that is located in the downward direction of the light deflecting device 14 as shown in FIG. 1c.

In this case, cross-sectional shapes of the second reflection surface 16b in the direction toward the horizontal axis X corresponding to the rotating direction of the movable mirror 30 can also be formed in a substantially circular shape having a center $O_{16b}$, so that the center $O_{16b}$ can be located within the range of the movable mirror 30 of the light deflecting device 14 as shown in FIG. 1a.

Figure 3:
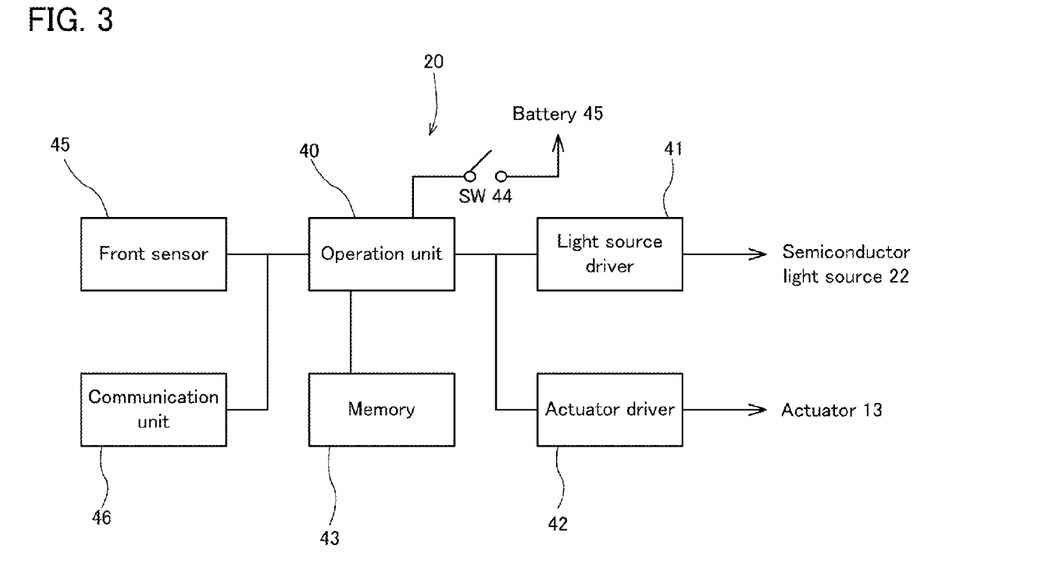

FIG. 3 is a block diagram showing the controller 20 of the vehicle headlight shown in FIG. 1a. The controller 20 can include: an operation unit 40 controlling various light distribution patterns projected by the vehicle headlight; a light source driver controlling brightness and the like of the laser beam emitted from the semiconductor light source 22; an actuator driver controlling the actuator 13 to scan the visual light having the substantially white color tone emitted from the light source unite 12 while associating the laser beam emitted from the semiconductor light source 22 with the movable mirror 30; and a memory 43 storing various data so that the vehicle headlight 10 can provide favorable light distribution patterns in accordance with surroundings.

The operation unit 40 can include a central processing unit (CPU) to control the various light distribution patterns, and the memory 43 can also store programs, which are ran by the CPU so as to conform a light distribution standard for a vehicle headlight. When Switch (SW) 44 of the vehicle headlight 10 turns on, a battery 45 installed in a vehicle can provide the controller 20 with a power supply. Then the operation unit 40 can control the actuator 13 using the actuator driver 42, and also can emit the visual light having the substantially white color tone from the light source unit 12 using the laser light emitted from the semiconductor light source 22 via the light source driver 41.

More specifically, the operation unit 40 can make the movable mirror 30 scan the visual light from the default position, where the movable mirror 30 can receive the visual light at the a position substantially perpendicular thereto, toward the upper end line 16a1 on the first reflection surface 16a by rotating the movable mirror 30 in a direction of the vertical axis Y with respect to the horizontal axis X using the actuator 13 via the actuator driver 42. When the visual light gets to a point of the upper end line 16a1, the operation unit 40 can make the actuator 13 slightly incline the movable mirror 30 in a direction of the horizontal axis X with respect to the vertical axis Y via the actuator driver 42 so that the visual light slightly moves in an outward direction of the upper end line 16a1 from the above-described position of the upper end line 16a1.

Next, the operation unit 40 can make the movable mirror 30 scan the visual light from the above-described point of the upper end line 16a1 on the first reflection surface 16a toward the lower end line 16b1 on the second reflection surface 16b through the central horizontal line by using the actuator 13 via the actuator driver 42. When the visual light gets to a point of the lower end line 16b1 on the second reflection surface 16b of the static mirror 16, the operation unit 40 can make the actuator 13 further slightly incline the movable mirror 30 in the direction of the horizontal axis X with respect to the vertical axis Y so that the visual light moves further slightly in the outward direction of the lower end line 16b1 from the above-described position of the lower end line 16b1 of the second reflection surface 16b.

In addition, when the visual light gets to a next point of the lower end line 16b1, the operation unit 40 can make the actuator 13 scan the visual light from the above-described next point of the lower end line 16b1 on the second reflection surface 16b toward the upper end line 16b1 on the first reflection surface 16a through the central horizontal line by using the actuator 13 via the actuator driver 42. When the visual light gets to a next point of the upper end line 16a1 on the first reflection surface 16a of the static mirror 16, the operation unit 40 can make the actuator 13 further slightly incline the movable mirror 30 in the direction of the horizontal axis X with respect to the vertical axis Y so that the visual light moves further slightly in the outward direction of the upper end line 16a1 from the above-described next position of the upper end line 16a1 of the first reflection surface 16b.

The operation unit 40 can make the movable mirror 30 repeat the above-described scanning. When the visual light gets to either an outward end of the upper end line 16a1 or an outer ward end of the lower end line 16b1, the operation unit 40 can make the movable mirror 30 repeat scanning the visual light from either one of the upper end line 16a1 or the lower end line 16b1 toward either another outward end of the upper end line 16a1 or another outer ward end of the lower end line 16b1. The operation unit 40 can make the movable mirror 30 repeat the above-described scanning at a speed that is impossible to be visible with a human eye (e.g. cycle of 60 Hz) while associating the visual light emitted from the light source unit 12 with the movable mirror 30 using the light source driver 41 and the actuator driver 42 via the actuator 13.

Figure 4A:
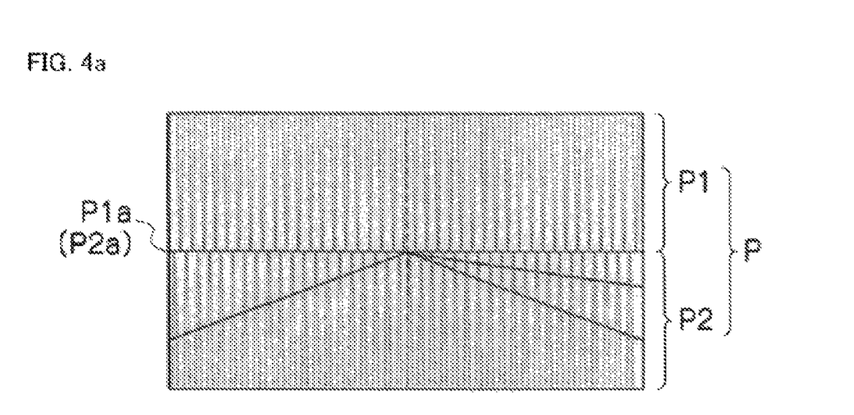
FIG. 4a is a diagram depicting an exemplary basic light distribution pattern for a high beam, which is projected by the vehicle headlight shown in FIGS. 1a to 1c.

In these cases, the visual light B1 having the substantially white color tone scanned and reflected on the first reflection surface 16a of the static mirror 16 can pass through the fifth opening H3 of the second end plate 18c of the housing 18 as shown in FIG. 1c, and can form an upward light distribution pattern P1 for a basic high beam pattern P as shown in FIG. 4a while the visual light B1 flips in the direction of the vertical Y axis with respect to the horizontal X axis.

Meanwhile, the visual light B2 scanned and reflected on the second reflection surface 16b of the static mirror 16 can pass through the sixth opening H4 of the second end plate 18c of the housing 18 as shown in FIG. 1c, and also can form a downward light distribution pattern P2 for the basic high beam pattern P as shown in FIG. 4a while the visual light B2 also flips in the direction of the vertical Y axis with respect to the horizontal X axis. Therefore, the vehicle headlight 10 can provide the basic high beam pattern P, which combines the upward light distribution pattern P1 with the downward light distribution pattern P2 for the basic high beam pattern P.

The basic high beam pattern P can form a light distribution near a horizontal line located between the upward light distribution pattern P1 and the downward light distribution pattern P2 as a brighter distribution pattern as compared with another light distribution other than the light distribution near the horizontal line. As a result, the basic light distribution pattern P can result in a favorable light distribution having a high level of far visibility for a vehicle headlight.

More specifically, when the operation unit 40 makes the movable mirror 30 repeat the scanning at a high speed between the upper end line 16a1 and the lower end line 16b1 of the static mirror 16 while associating the visual light emitted from the light source unit 12 with the movable mirror 30 using the light source driver 41 and the actuator driver 42 via the actuator 13, the operation unit 40 can enable the movable mirror 30 to vary a speed of the scanning between the upper end line 16a1 and the lower end line 16b1 of the static mirror 16 using the actuator driver 42 via the actuator 13.

The operation unit 40 can enable the movable mirror 30 to null the speed of the scanning near the upper end line 16a1 and the lower end line 16b1 of the static mirror 16, although in a very short time. Accordingly, a light distribution pattern P1a projected by the first reflection surface 16a located close to the upper end line 16a1 can become brighter than another light distribution pattern other than the upward light distribution pattern P1. Similarly, a light distribution pattern P2a projected by the second reflection surface 16b located close to the lower end line 16b1 can become brighter than another light distribution pattern other than the light distribution pattern P2a.

According to an exemplary vehicle headlight of the disclosed subject matter, the downward light distribution pattern P2 can be projected in a direction toward the light-emission of the vehicle headlight 10 while the visual light B2 flips in the direction of the vertical axis Y with respect to the horizontal axis X, and also the upward light distribution pattern P1 can be projected in the direction toward the light-emission of the vehicle headlight 10 while the visual light B1 flips in the direction of the vertical axis Y with respect to the horizontal axis X. Thus, the vehicle headlight 10 of the disclosed subject matter can provide a favorable light distribution having a high level of far visibility as a vehicle headlight.

When the vehicle headlight 10 provides the above-described favorable light distribution patter, each of a imaginary plane connecting the second focus $F2_{16a}$ of the first reflection surface 16a of the static mirror 16 to the upper end line 16a1 of the first reflection surface 16a and another imaginary plane connecting the second focus $F2_{16b}$ of the second reflection surface 16b of the static mirror 16 to the lower end line 16b1 of the second reflection surface 16b can be configured to be substantially parallel to the horizontal X axis of the second end plate 18c of the housing 18. Thereby, each of lights reflected by both reflection surfaces located close to both end lines 16a1 and 16b1 of the first reflection surface 16a and the second reflection surface 16b can be projected in a direction substantially parallel to the horizontal X axis of the second end plate 18c of the housing 18 so as to overlap with respect to each other, in order to provide a favorable light distribution for a driver.

A case where the operation unit 40 makes the movable mirror 30 scan the visual light between the upper end line 16a1 and the lower end line 16b1 of the static mirror 16 in the direction of the vertical Y axis is described above. However, even when the operation unit 40 makes the movable mirror 30 scan the visual light between both outward ends of the static mirror 16 in the direction of the horizontal axis X, the basic high beam pattern P can form the favorable light distribution having a high level of far visibility such that the basic high beam pattern P can form the light distribution near the horizontal line located between the upward light distribution pattern P1 and the downward light distribution pattern P2 as the brighter pattern as compared with the other light distribution other than the light distribution near the horizontal line.

In this case, the above-described basic high beam pattern P can also be formed by increasing a light-emitting intensity of the laser beam emitted from the semiconductor light source 22 near the upper end line 16a1 of the first reflection surface 16a and the lower end line 16b1 of the second reflection surface 16b of the static mirror 16 and by decreasing the light-emitting intensity of the laser beam near the both outward ends of the static mirror 16. In addition, the vehicle headlight 10 can also provide various light distribution patterns by varying the light-emitting intensity of the laser beam emitted from the semiconductor light source 22 in accordance with surroundings such as an oncoming vehicle, a forward travelling vehicle, a road and the like, as described later with reference to FIG. 4b.

Here, a fail-safe structure of the vehicle headlight 10 of the disclosed subject matter will now be described. As described above, the operation unit 40 can control the actuator 13 via the actuator driver 42 at a very high speed, and the actuator 13 may also make the movable mirror 30 conduct various operations at a very high speed to scan the visual light using the torsion holder 15a and 15b. Accordingly, the movable mirror 30 may break down for any reason while the movable mirror 30 has been used under an inhospitable environment for a very long time.

When the actuator 207 of the conventional headlight 200 shown in FIG. 5 is out of order, the movable mirror 209 may return at a default position, where the movable mirror 209 maintains a position having an inclined angle with respect to a light-emitting direction of the visual light emitted from the semiconductor light source 201 due to a restitution effect of the torsion bar 204a. Therefore, when the actuator 207 breaks down for any reason, the conventional vehicle headlight 200 may cause a problem such that visual light is emitted at a particular direction in a focused manner, and thereby should result in giving an unfavorable light distribution to drivers of an own vehicle, an oncoming vehicle, etc.

On the other hand, in the vehicle headlight 10 of the disclosed subject matter, the movable mirror 30 can be attached to the light deflecting device 14 via the torsion holder 15a and 15b in the default position so that the movable mirror 30 can receive the visual light having substantially white color tone at the a position substantially perpendicular thereto. Accordingly, even if the actuator 13 of the vehicle headlight 10 shown in FIG. 1a may be out of order, the movable mirror 30 may return to the default position, where the visual light emitted from the light source unit 12 returns toward the light source unit 12 via the fourth opening H2 of the second end plate 18c and the third opening H1 of the first end plate 18b due to the restitution effect of the torsion holder 15a and 15b.

Thus, the vehicle headlight 10 of the disclosed subject matter can prevent the problem such that visual light is emitted at a particular direction in a focused manner, and thereby causes the unfavorable light distribution to drivers of an own vehicle, an oncoming vehicle, etc. In this case, the other normal vehicle headlight 10, which is located at either a front right or a front left of the vehicle, may provide the favorable light distribution pattern by increasing the light-emitting intensity of the semiconductor light source 22 in place of the dead vehicle headlight. Even in such a case, the above-described controller 20 can control the other normal vehicle headlight while maintaining the dead vehicle headlight at the safe default position for the fail-safe structure described above, because the controller 20 can be configured to control two vehicle headlights by installing two light source drivers and two actuator drivers into the controller 20.

The controller 20 of the vehicle headlight 10 can further include a front sensor 45 detecting surrounding and a communication unit 46 as shown in FIG. 3. The surrounding information detected by the front sensor 45 can mean an existence or a non-existence of a pedestrian, a bicycle, an oncoming vehicle, a frontward travelling vehicle, an obstacle and the like, and can include a road surface condition, weather condition, lighting condition, vehicle speed or acceleration, and other information that may be helpful in determining an optimal light distribution pattern.

A camera, a radar detector, a sonic sensor, a thermocouple, a CCD array, and the like can be used as the front sensor 45, which can be attached between a front glass and a room mirror, to a dash board of a vehicle and the like in a forward direction of the vehicle leadlight 10. The above-described memory 43 can also be used to memorize locating information such as a traffic signal, external lighting, a traffic sign and the like and a map information such as a road map including two-dimensional and three-dimensional geometric information.

The communication unit 46 can receive location information for the vehicle in which the system is incorporated, time information, weather information, etc., via communication with outside devices. The controller 20 of the vehicle headlight 10 can also receive various information related to the memory 43 and the communication unit 46 from other devices included in the vehicle, such as from a navigation system, etc. The operation unit 40 can receive various information output from the front sensor 45, the memory 43 and the communication unit 46 and can determine an optimum light distribution pattern, which should be projected by the vehicle headlight 10.

In addition, the operation unit 40 can output information characteristics of the optimum light distribution pattern including a shape thereof and a light intensity distribution to the light source driver 41 while associating the laser beam emitted from the semiconductor light source 22 with a light-emitting direction of the visual light having the substantially color tone emitted from the light source unit 12 scanned by the movable mirror 30 via the static mirror 16.

In this case, the information output from the front sensor 45, the memory 43 and the communication unit 46 can be sequentially updated. Therefore, determination of the optimum light distribution pattern and outputs of the information such as the shape and the light intensity distribution in regard to the optimum light distribution pattern can be repeated at a predetermined interval. A forming process for a light distribution pattern formed by the vehicle headlight 10 including the front sensor 45 and the communication unit will now be described with reference to FIG. 3 and FIG. 4a to FIG. 4c.

When the operation unit 40 determines the optimum light distribution pattern, the operation unit 40 can control the light source driver 41 and the actuator driver 42 so that the visual light having the substantially white color tone can form a variable light distribution pattern using the movable mirror 30 and the semiconductor light source 22. When the variable light distribution pattern is the basic high beam pattern P for a high beam as shown in FIG. 4a, the operation unit 40 can control the light source driver 41 and the actuator driver 42 so that the visual light emitted from the light source unit 12 can be scanned by the movable mirror 30 using the above-described scanning methods.

Hence, when the front sensor 45 determines the non-existence of a pedestrian, a bicycle, an oncoming vehicle, a frontward travelling vehicle and the like, the vehicle headlight 10 can form the basic high beam pattern P for a high beam, which is composed of the upward distribution pattern P1 and the downward light distribution pattern P2. In this case, the operation unit 40 can enable the light source driver 41 to emit both regions on the upward light distribution pattern P1 and the downward light distribution pattern P2 for a high beam with a brighter light intensity, for example, along a driving road in accordance with the information output from the front sensor 45, the memory 43 and the communication unit 46.

Here, when the vehicle corners rightward, the operation unit 40 can drive the light source 41 and the actuator driver 42 so that the visual light having the substantially white color tone emitted from the light source unit 12 can be scanned wholly in a rightward direction as compared with the basic light distribution pattern P by the movable mirror 30 via the static mirror 16. Accordingly, because the vehicle headlight 10 can form a favorable light distribution pattern in accordance with running conditions, the vehicle headlight 10 can improve visibility for a driver.

Figure 4B:
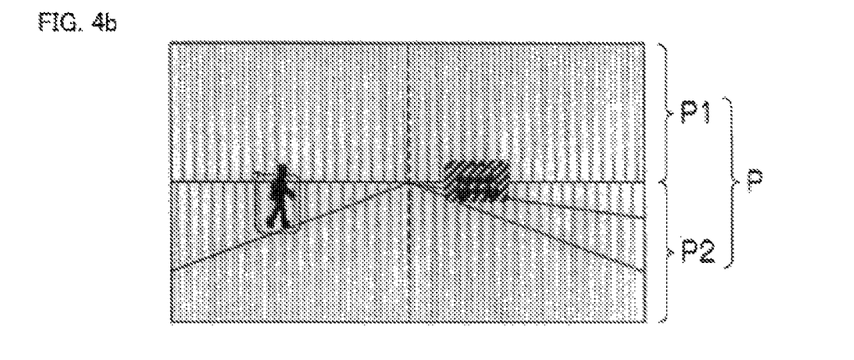
FIG. 4b is a diagram depicting an exemplary light distribution pattern projected by the vehicle headlight in accordance with surroundings such as an existence and a location of an oncoming vehicle.

Next, when the front sensor 45 determines the existence of a pedestrian and an oncoming vehicle, the operation unit 40 can enable the light source driver 41 to emit lower light intensity to a region where the oncoming vehicle is located as compared to other regions in accordance with the information output from the front sensor 45 as shown in FIG. 4b. Additionally, the operation unit 40 can enable the light source driver 41 to blink with a lower light intensity to another region where the pedestrian is located unlike the other regions in accordance with the information output from the front sensor 45, so as to call attention to the pedestrian while preventing the pedestrian from being concerned, confused or from hesitating.

Figure 4C:
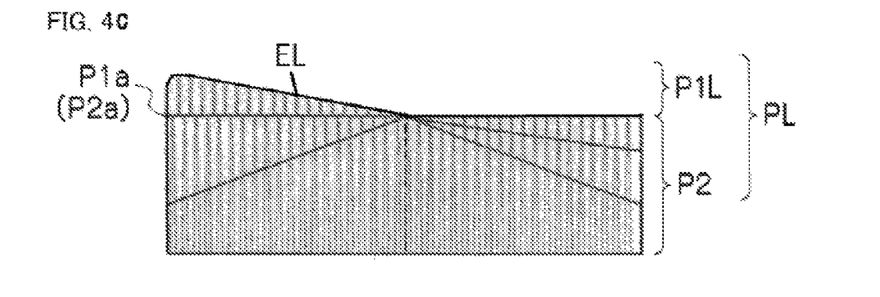
FIG. 4c is a diagram depicting an exemplary basic light distribution pattern for a low beam, which is projected by the vehicle headlight.

When the vehicle drives in a downtown area, the operation unit 40 can enable the light source driver 41 and the actuator driver 42 to scan the visual light emitted from the light source unit 12 on a basic low beam pattern PL including an elbow line EL using the movable mirror 30 and the static mirror 16 as shown in FIG. 4c. In this case, the vehicle headlight 10 can form an elbow pattern P1L on the downward light distribution pattern P2 including the brighter light distribution P1a and P2a near the horizontal line as described above, and therefore can improve visibility for a driver while the vehicle headlight 10 does not give a glaring type light to an oncoming vehicle.

Here, during wet weather, the operation unit 40 can drive the light source driver 41 and the actuator driver 42 so that the visual light having the substantially white color tone emitted from the light source unit 12 can be scanned to light up on the downward light distribution pattern P2 using the second reflection surface 16b of the static mirror 16 via the movable mirror 30. Therefore, because the vehicle headlight 10 can form the brighter downward light distribution pattern P2, the vehicle headlight 10 can improve visibility for a driver while the vehicle headlight 10 does not give a glaring type light to an oncoming vehicle and while the driver can avoid rain puddles and the like.

As described above, the movable mirror 30 and the actuator 13 controlling the movable mirror 30, and the light source unit 12 can be located in the facing position with respect to each other. The static mirror 16, which scans and reflects the visual light emitted from the light source unit 12 in the light-emitting direction of the vehicle headlight 10 via the movable mirror 30, can be located between the light source unit 12 and the movable mirror 30. In addition, the visual light having the white color tone, which is scanned by the static mirror 16 and can conform to a standard for a vehicle headlight, can be emitted from the above-described small opening, which is at least one of the fifth opening H3 and the sixth opening H4 that are located in the upward and downward direction of the movable mirror 30, respectively.

Therefore, the disclosed subject matter can include the vehicle headlight 10 using the light source unit 12 and the movable mirror 30, which can provide various light distribution patterns, for example, the elbow pattern P1L for a low beam, the upward light distribution pattern P1 for a high beam, the right and left cornering pattern used when cornering rightward and leftward, respectively, and the downward light distribution pattern P2 for the low and high beam, use during wet weather and the like, by varying a scanning method of the movable mirror 30 facing the light source unit 12 using the controller 20. The vehicle headlight can also provide the brighter light distribution P1a and P2a near the horizontal line located between the light distribution patterns P1 and P2 with a compact structure such that can be employed as a headlight for a small size car, as described above.

Moreover, the movable mirror 30 can be attached to the light deflecting device 14 in the default position, where the movable mirror 30 can receive the visual light at the substantially position perpendicular thereto, and therefore can return the visual light toward the light source unit 12 at the default position. Thus, the disclosed subject matter can also include the vehicle headlight 10 that can form various light distribution patterns to enhance a visibility for a drive with a simple structure, and which can provide the favorable fail safe structure even if the actuator 13 may fail to operate properly due to any cause such as a disconnection, a mechanical fatigue and the like.

Furthermore, the vehicle headlight 10 of the disclosed subject matter can further include the front sensor 45 associated with the controller 20, and the front sensor 45 can be configured to detect surrounding information, wherein the operation unit 40 of the controller 20 is configured to receive the surrounding information from the front sensor 45. The vehicle headlight 10 also can further include the communication unit 46 incorporated into the controller 20. The communication unit 46 can be configured to receive communication information, wherein the operation unit 40 of the controller 20 is configured to receive the communicate information from the communication unit 46.

Accordingly, the vehicle headlight 10 can detect the surrounding information using the front sensor 45 and can determine the optimum light distribution pattern using the operation unit 40 in accordance with the surrounding information. The vehicle headlight 10 can also receive location information for the vehicle, time information, weather information and the like and can also determine the optimum light distribution pattern using the operation unit 40 in accordance with the communication information. Thus, the disclosed subject matter can provide the vehicle headlight 10 that can form the optimum light distribution pattern in accordance with the surrounding information and the communication information.

In addition, a case where the second reflection surface 16b of the static mirror 16 is continuously integrated with the first reflection surface 16a is described. However, the static mirror 16 is not limited to this structure. The static mirror 16 can also be composed of either one of the first reflection surface 16a or the second reflection surface 16b, and also each of the first reflection surface 16a and the second reflection surface 16b can be formed in various shapes. In the case, either one of the fifth opening H3 or the sixth opening H4 can be removed, and also each of the fifth opening H3 and the sixth opening H4 of the second end plate 18c of the housing 18 can be formed in various shapes to fit each shape of the first reflection surface 16a and the second reflection surface 16b.

Moreover, the second reflection surface 16b of the static mirror 16 can be continuously integrated with the first reflection surface 16a so that a boundary between the first reflection surface 16a and the second reflection surface 16b of the static mirror 16 is substantially parallel to the vertical Y axis of the second end plate 18c of the housing 18 while each location of the fifth opening H3 and the sixth opening H4 of the second end plate 18c varies to fit each location of the first reflection surface 16a and the second reflection surface 16b.

As described above, the vehicle headlight 10 can include the light source unit 12, the movable mirror 30 facing the light source unit 12, and the static mirror 16 located between the light source unit 12 and the movable mirror 30, and therefore can be formed with a simple structure including the favorable fail safe structure. The vehicle headlight 10 can include the front sensor 45 for detecting the surrounding condition(s) and the communication unit 46 to receive the map information and the like while the operation unit 40 controls the light source driver 41 and the actuator driver 42 using the memory 43. Thus, the disclosed subject matter can provide a vehicle headlight formed with a compact structure, which can form various optimum light distribution patterns to enhance visibility for a driver in accordance with the surrounding condition, the map information, etc.

While there has been described what are at present considered to be exemplary embodiments of the invention, it will be understood that various modifications may be made thereto, and it is intended that the appended claims cover such modifications as fall within the true spirit and scope of the invention. All conventional art references described above are herein incorporated in their entirety by reference.

What is claimed is:

1. A vehicle headlight comprising:
a housing having a body, a first end plate and a second end plate, and the body formed in a tubular shape having a first opening and a second opening facing the first opening, the first end plate having an outer surface, an inner surface and a third opening passing through the outer surface and the inner surface, the first end plate located adjacent the first opening of the body, the inner surface of the first end plate facing the second opening of the body, the second end plate having a fourth opening, X axis and Y axis substantially perpendicular to the X axis, and also having a fifth opening and a sixth opening, each of the fifth opening and the sixth opening being separated by the X axis and intersecting with the Y axis, the fourth opening of the second end plate intersecting with the X axis and the Y axis, and each of the fourth opening, the fifth opening and the sixth opening passing through the second end plate, the second end plate being located adjacent the second opening of the body, and the fourth opening of the second end plate facing the third opening of the first end plate of the housing;

a light source unit having a semiconductor light source located adjacent the outer surface of the first end plate, and configured to emit light having a substantially white color tone substantially toward an intersection of the X axis and the Y axis of the second end plate of the housing via the third opening of the first end plate of the housing;

a light deflecting device having a movable mirror and a torsion holder, and located adjacent the second end plate of the housing so as to cover the fourth opening of the second end plate, the torsion holder supporting the movable mirror from both directions of the X axis and the Y axis substantially toward the intersection of the X axis and the Y axis so that the movable mirror is configured to rotate with reference to the X axis and the Y axis, the movable mirror having a default position being located toward the third opening of the first end plate of the housing, and the movable mirror located substantially at the intersection of the X axis and the Y axis, the default position of the movable mirror being determined by a restoring force of the torsion holder and the movable mirror being substantially perpendicular to a light-emitting direction of the light having the substantially white color tone emitted from the light source unit at the default position of the movable mirror;

an actuator located adjacent the light deflecting device, and configured to rotate the movable mirror in at least one direction of the X axis and the Y axis via the torsion holder during operation;

a static mirror having at least one of a first reflection surface and a second reflection surface being located adjacent the inner surface of the first end plate of the housing so as to avoid blocking the third opening of the first end plate, the first reflection surface having an end line formed in a substantially spheroidal shape having a first focus and a second focus, the first focus of the first reflection surface being located substantially at the movable mirror, the second focus of the first reflection surface being located substantially at the fifth opening of the second end plate, the second reflection surface having an end line also formed in a substantially spheroidal shape having a first focus and a second focus, the first focus of the second reflection surface being located substantially at the movable mirror, and the second focus of the second reflection surface being located substantially at the fifth opening of the second end plate; and a controller having an operation unit, an actuator driver and a light source driver, the actuator driver configured to control the actuator, the light source driver configured to control the semiconductor light source, and the operation unit configured to control the actuator driver and the light source driver;

wherein the operation unit associates the light having the substantially white color tone emitted from the light source unit with the movable mirror via the actuator driver, and thereby the light having the substantially white color tone is configured to be projected from at least one of the fifth opening and the sixth opening of the second end plate via the movable mirror, and at least one of the first reflection surface of the static mirror is configured to reflect the light toward the fifth opening of the second end plate and the second reflection surface of the static mirror is configured to reflect the light toward the sixth opening of the second end plate during operation.

2. The vehicle headlight according to claim 1, wherein the semiconductor light source of the light source unit is composed of at least one of a blue laser diode configured to emit a blue laser beam, a green laser diode configured to emit a green laser beam, a red laser diode configured to emit a red laser beam and an ultraviolet laser diode configured to emit an ultraviolet laser beam.

3. The vehicle headlight according to claim 1, wherein the second reflection surface of the static mirror is continuously integrated with the first reflection surface, and a boundary between the first reflection surface and the second reflection surface of the static mirror is substantially parallel to the X axis of the second end plate of the housing.

4. The vehicle headlight according to claim 2, wherein the second reflection surface of the static mirror is continuously integrated with the first reflection surface, and a boundary between the first reflection surface and the second reflection surface of the static mirror is substantially parallel to the X axis of the second end plate of the housing.

5. The vehicle headlight according to claim 1, wherein each of an imaginary plane connecting the second focus of the first reflection surface of the static mirror to the end line of the first reflection surface and another imaginary plane connecting the second focus of the second reflection surface of the static mirror to the end line of the second reflection surface is substantially parallel to the X axis of the second end plate of the housing, and thereby light rays having the substantially white color tone reflected by reflection surfaces located close to both end lines of the first reflection surface and the second reflection surface of the static mirror are projected in a direction substantially parallel to the X axis of the second end plate of the housing so as to overlap with respect to each other.

6. The vehicle headlight according to claim 2, wherein each of an imaginary plane connecting the second focus of the first reflection surface of the static mirror to the end line of the first reflection surface and another imaginary plane connecting the second focus of the second reflection surface of the static mirror to the end line of the second reflection surface is substantially parallel to the X axis of the second end plate of the housing, and thereby light rays having the substantially white color tone reflected by reflection surfaces located close to both end lines of the first reflection surface and the second reflection surface of the static mirror are projected in a direction substantially parallel to the X axis of the second end plate of the housing so as to overlap with respect to each other.

7. The vehicle headlight according to claim 1, wherein at least one of the first reflection surface and the second reflection surface of the static mirror is integrated with the inner surface of the first end plate of the housing, and therefore is formed on the inner surface of the first end plate of the housing.

8. The vehicle headlight according to claim 2, wherein at least one of the first reflection surface and the second reflection surface of the static mirror is integrated with the inner surface of the first end plate of the housing, and therefore is formed on the inner surface of the first end plate of the housing.

9. The vehicle headlight according to claim 1, further comprising:
  a front sensor associated with the controller and configured to detect surrounding information, wherein the operation unit of the controller is configured to receive the surrounding information from the front sensor.

10. The vehicle headlight according to claim 1, further comprising:
  a communication unit included in the controller and configured to receive communication information, wherein the operation unit of the controller is configured to receive the communicate information from the communication unit.

11. A vehicle headlight comprising:

a housing having a body, a first end plate and a second end plate, and the body formed in a tubular shape having a first opening and a second opening facing the first opening, the first end plate having an outer surface, an inner surface and a third opening passing through the outer surface and the inner surface, the first end plate located adjacent the first opening of the body, the inner surface of the first end plate facing the second opening of the body, the second end plate having a fourth opening, X axis and Y axis substantially perpendicular to the X axis, and also having a fifth opening and a sixth opening, each of the fifth opening and the sixth opening being separated by the X axis and intersecting with the Y axis, the fourth opening of the second end plate intersecting with the X axis and the Y axis, and each of the fourth opening, the fifth opening and the sixth opening passing through the second end plate, the second end plate being located adjacent the second opening of the body, and the fourth opening of the second end plate facing the third opening of the first end plate of the housing;

a light source unit having a semiconductor light source and a wavelength converting material located adjacent the outer surface of the first end plate, the wavelength converting material disposed between the semiconductor light source and at least the third opening of the first end plate of the housing, and the light source unit configured to emit a visual light substantially toward an intersection of the X axis and the Y axis of the second end plate of the housing via the third opening of the first end plate of the housing during operation;

a light deflecting device having a movable mirror and a torsion holder, and located adjacent the second end plate of the housing so as to cover the fourth opening of the second end plate, the torsion holder supporting the movable mirror from both directions of the X axis and the Y axis substantially toward the intersection of the X axis and the Y axis so that the movable mirror is configured to rotate with reference to the X axis and the Y axis, the movable mirror having a default position located toward the third opening of the first end plate of the housing, and the movable mirror located substantially at the intersection of the X axis and the Y axis, the default position of the movable mirror being determined by a restoring force of the torsion holder and the movable mirror being substantially perpendicular to a light-emitting direction of the visual light emitted from the light source unit at the default position of the movable mirror;

an actuator located adjacent the light deflecting device, and configured to rotate the movable mirror in at least one direction of the X axis and the Y axis via the torsion holder during operation;

a static mirror having a first reflection surface, a second reflection surface and a boundary located between the first reflection surface and the second reflection surface, and the static mirror located adjacent the inner surface of the first end plate of the housing so as to avoid blocking the third opening of the first end plate, the first reflection surface having an end line formed in a substantially spheroidal shape having a first focus and a second focus, the first focus of the first reflection surface being located substantially at the movable mirror, the second focus of the first reflection surface located substantially at the fifth opening of the second end plate, the second reflection surface having an end line also formed in a substantially spheroidal shape having a first focus and a second focus, the first focus of the second reflection surface located substantially at the movable mirror, and the second focus of the second reflection surface located substantially at the fifth opening of the second end plate, and the boundary between the first reflection surface and the second reflection surface located substantially parallel to the X axis of the second end plate of the housing; and a controller having an operation unit, an actuator driver and a light source driver, the actuator driver configured to control the actuator, the light source driver configured to control the semiconductor light source, and the operation unit configured to control the actuator driver and the light source driver;

wherein the operation unit associates the visual light emitted from the light source unit with the movable mirror via the actuator driver, and thereby the visual light is configured to be projected from the fifth opening and the sixth opening of the second end plate via the movable mirror and the first reflection surface of the static mirror reflecting the light toward the fifth opening of the second end plate and the second reflection surface of the static mirror reflecting the light toward the sixth opening of the second end plate during operation.

12. The vehicle headlight according to claim 11, wherein the semiconductor light source of the light source unit is a laser device configured to emit a blue laser beam and the wavelength converting material includes a phosphor material that is selected from the group consisting of a yellow phosphor, and two phosphors including a red phosphor and a green phosphor.

13. The vehicle headlight according to claim 11, wherein the semiconductor light source of the light source unit is a laser device configured to emit an ultraviolet laser beam and the wavelength converting material includes at least one of a red phosphor, a green phosphor and a blue phosphor.

14. The vehicle headlight according to claim 11, wherein each of an imaginary plane connecting the second focus of the first reflection surface of the static mirror to the end line of the first reflection surface and another imaginary plane connecting the second focus of the second reflection surface of the static mirror to the end line of the second reflection surface is configured to be substantially parallel to the X axis of the second end plate of the housing, and thereby light rays reflected by reflection surfaces located close to both end lines of the first reflection surface and the second reflection surface of the static mirror are configured to be projected in a direction substantially parallel to the X axis of the second end plate of the housing so as to overlap with respect to each other.

15. The vehicle headlight according to claim 12, wherein each of an imaginary plane connecting the second focus of the first reflection surface of the static mirror to the end line of the first reflection surface and another imaginary plane connecting the second focus of the second reflection surface of the static mirror to the end line of the second reflection surface is configured to be substantially parallel to the X axis of the second end plate of the housing, and thereby light rays reflected by reflection surfaces located close to both end lines of the first reflection surface and the second reflection surface of the static mirror are configured to be projected in a direction substantially parallel to the X axis of the second end plate of the housing so as to overlap with respect to each other.

16. The vehicle headlight according to claim 11, wherein at least one of the first reflection surface and the second reflection surface of the static mirror is integrated with the inner surface of the first end plate of the housing, and therefore is formed on the inner surface of the first end plate of the housing.

17. The vehicle headlight according to claim 12, wherein at least one of the first reflection surface and the second reflection surface of the static mirror is integrated with the inner surface of the first end plate of the housing, and therefore is formed on the inner surface of the first end plate of the housing.

18. The vehicle headlight according to claim 11, further comprising:
 a front sensor associated with the controller and configured to detect surrounding information, wherein the operation unit is configured to receive the surrounding information from the front sensor.

19. The vehicle headlight according to claim 11, further comprising:
 a communication unit included in the controller and configured to receive communication information, wherein the operation unit of the controller is configured to receive the communicate information from the communication unit.

20. The vehicle headlight according to claim 18, further comprising:
 a communication unit included in the controller and configured to receive communication information, wherein the operation unit of the controller is configured to receive the communicate information from the communication unit.

* * * * *